United States Patent [19]
Holko et al.

[11] 3,758,741
[45] Sept. 11, 1973

[54] ENHANCED DIFFUSION WELDING
[75] Inventors: Kenneth H. Holko, Strongsville; Thomas J. Moore, Berea, both of Ohio
[73] Assignee: The United States of America as represented by the Administrator of the National Aeronautics and Space Administration, Washington, D.C.
[22] Filed: Sept. 14, 1972
[21] Appl. No.: 289,033

[52] U.S. Cl.................... 219/91, 29/497, 219/117
[51] Int. Cl............................................ B23k 19/00
[58] Field of Search...................... 219/91, 96, 117, 219/118; 29/497, 497.5, 498

[56] References Cited
UNITED STATES PATENTS
3,680,197   8/1972   Blum et al. ........................... 29/497
3,676,637   7/1972   Anderson.............................. 219/91

OTHER PUBLICATIONS
J. M. Parks, "Recrystallization Welding," Welding Journal, U. 32(5), 2095–2225, (1953).

Primary Examiner—J. V. Truhe
Assistant Examiner—B. A. Reynolds
Attorney—N. T. Musial et al.

[57] ABSTRACT

Surfaces of unrecrystallized alloys are sanded and polished. This is followed by a two-step welding process wherein the strength of the parent metal is retained at the weld joint. The first step forces the surfaces into intimate contact at a temperature where the metal still has good ductility. The second step causes diffusion, rerystallization, and grain growth across the original weld interface.

10 Claims, No Drawings

ENHANCED DIFFUSION WELDING

BACKGROUND OF THE INVENTION

The invention described herein was made by employees of the United States Government and may be manufactured and used by or for the Government for governmental purposes without the payment of any royalties thereon or therefor.

PRIOR ART

This invention is concerned with using solid state welding to achieve strong welds with metals that undergo recrystallization upon heating. The invention is particularly directed to welding dispersion-strengthened nickel alloys.

Conventional brazing and fusion welding methods, such as resistance spot welding, have been used to join certain alloys. Fusion welding and brazing methods result in weldments having approximately 50 percent of the parent metal strength.

Brazing dispersion-strengthened nickel alloys, such as $Ni-ThO_2$, $Ni-Cr-ThO_2$, $Ni-Mo-ThO_2$, and $Ni-Cr-Al-ThO_2$, involves degradation of parent metal strength. Diffusion occurring between the braze alloy and parent metal at elevated temperatures causes porosity to form in the parent metal as well as in the braze alloy. The thoria dispersion, which is critical to the development of strength, may be destroyed. Also the texture produced by thermomechanical processing may be lost. In addition, the braze alloy is not as strong at elevated temperatures as the dispersion-strengthened nickel alloy. All of these factors can contribute to weak brazements.

Fusion welding necessarily involves melting of the dispersion-strengthened nickel alloy, and the thoria dispersion is lost. Thus the strengthening effect of the thoria is lost, and the weldment is relatively weak.

Solid-state welding using both direct resistance heating at the joint and indirect heating from resistance heated elements has been proposed for joining alloys. Solid-state welding is desirable because melting is avoided and foreign material need not be introduced at the joint. However, conventional solid-state welds have proven to be weak and brittle when tested at elevated temperatures. A thin recrystallized band of small grains forms at a continuous weld line which acts as a boundary. The continuous weld line and the small grains cause weakness at elevated temperatures. This results in joint failure at low stresses. Typically, joint efficiency is 0 to 60 percent. Also, unwelded areas occur sporadically at the weld line.

SUMMARY OF THE INVENTION

These problems have been solved by enhanced diffusion welding in accordance with the present invention wherein uncrystallized nickel alloys are used as a starting material. Sanding and electropolishing provide very flat surfaces free of stored energy which prevents the formation of small grains at the interface. Recrystallization produced during the weld cycle eliminates the weld line.

A dispersion-strengthened nickel alloy is first heated to 1,300°F at 30,000 psi for 1 hour. This is followed by heating to 2,175°F at 2000 psi for 2 hours. Recrystallization occurs upon heating, and the original weld interface is removed by grain growth across it.

OBJECTS OF THE INVENTION

It is, therefore, an object of the present invention to provide a method of solid-state welding dispersion-strengthened materials without losing strength in the parent metal or at the weld.

Another object of the invention is to provide a method of welding the dispersion-strengthened nickel alloys $Ni-ThO_2$, $Ni-Cr-ThO_2$, $Ni-Mo-ThO_2$ and $Ni-Cr-Al-ThO_2$.

A further object of the invention is to provide a method of solid state welding unrecrystallized alloys without producing a weld line at the interface.

These and other objects of the invention will be apparent from the specification which follows.

DESCRIPTION OF THE PREFERRED EMBODIMENT

Sheets of a nickel base alloy, commercially designated as TD—NiCr, were welded in accordance with the present invention to illustrate the advantages of enhanced diffusion welding. Normally commercial TD—NiCr is recrystallized, but specially processed sheets of this material were prepared. The special processing consisted of omitting the final recrystallization heat treatment that is normally given to commercial TD—NiCr after thermomechanical processing. Thus the specially processed TD—NiCr was in the unrecrystallized condition in which the grain size is extremely fine. The sheets had a nominal thickness of 1.6 millimeters.

TD-NiCr has a nominal composition of 20 percent chromium, 2 percent thoria and the remainder nickel. The alloy has good high temperature strength and oxidation resistance. The TD—NiCr derives its high temperature and oxidation resistance. The TD—NiCr derives its high temperature strength from mechanical working of the Ni-20 weight percent Cr matrix which contains a fine dispersion of $ThO_2$ particles. Use of this metal has been suggested for applications where metal temperatures may reach about 2,200°F in an oxidizing environment. These metals have potential applications in jet engine components and heat shield panels for space shuttle vehicles.

Commercial TD—NiCr sheets having the same thickness were also welded for comparison purposes. Commercial TD—NiCr is made from the special processed material by recrystallization at 2,150°F for 2 hours. This heat treatment is termed as stress relieving. The commercial material is more ductile at room temperature than the special processed material, and it is more formable.

A vacuum hot press was used to make diffusion lap welds in both the commercial and the special processed TD—NiCr. The weld specimens were radiantly heated by a tantalum resistance heater. Molybdenum rams were used to transmit welding force from a 25 ton hydraulic press to the weld specimens. A pressure of $2 \times 10^{-5}$ torr was maintained in the vacuum chamber during welding.

Both types of TD—NiCr sheets in the as-received condition had 120-grit sanded surfaces with the surface scratches parallel to the principal rolling direction. The surfaces were prepared for welding in three different ways. Some weld specimens were prepared by cleaning the as-received 120-grit sanded surfaces with methanol and trichlorotrifluorethane before welding. Other specimens were prepared by sanding both sides with 180- grit paper, sanding the side to be welded with 600-grit paper, cleaning with methanol and trichlorotrifluorethane, and storing in trichlorotrifluorethane to minimize oxidation. Finally, some specimens were sanded to 600-grit paper as described, then electropolished, cleaned with methanol and trichlorotrifluorethane, and stored in trichlorotrifluorethane. The specimen surfaces in contact with the molybdenum rams were coated with $Al_2O_3$ to prevent sticking.

After overlapping the specimens approximately one-half inch, a vacuum of $2\times10^{-5}$ torr was attained in the weld chamber. The specimens were heated to the welding temperature, the welding force was applied, and diffusion welding was achieved. No measurable deformation was recorded after welding.

A two-step weld cycle shown in TABLE I produced the best welds. This cycle consisted of a low temperature, high pressure portion wherein the material was heated to about 1,300°F at a pressure of 30,000 psi for 1 hour. This was followed by a high temperature, low pressure portion wherein the material is heated to about 2,175°F and 2,000 psi for 2 hours. Both steps were performed in a vacuum of $2\times10^{-5}$ torr.

TABLE I. — PREFERRED WELD CYCLE

| | Temperature °F | Pressure psi | Time hr | Vacuum torr |
|---|---|---|---|---|
| Step I | 1300 | 30,000 | 1.0 | $2\times10^{-5}$ |
| Step II | 2175 | 2,000 | 2.0 | |

Other welds were made using the cycles shown in TABLE II in a vacuum of $2\times10^{-5}$ torr. The welds produced with these cycles were not as good as those using the two step weld cycle shown in TABLE I.

The weldments were evaluated both metallographically and by tensile and creep-rupture shear tests. The same specimen configuration was machined from the weldments for tensile-shear and creep-rupture shear testing. This test specimen configuration had a test section with a 1.6 millimeter overlap and a 4.3 millimeter width. All specimens were heat treated at 2,300°F for 1 hour in vacuum before testing to stress relieve the weldment. Specimens were tensile shear tested in air at 2,000°F at a crosshead speed of 1.3 millimeters per minute. Creep-rupture shear tests were conducted at 2,000°F in air with deadweight loading of about 16 pounds.

In order to compare the weld strengths to parent metal strength, parent metal shear specimens were machined and tested. Testing conditions were the same as for the weld specimens.

TABLE II — OTHER WELD CYCLES

Specially Processed TD-NiCr

| Surface preparation | Temp. °F | Pressure psi | Time, hr |
|---|---|---|---|
| 120-grit sanded | 1900 | 11,000 | 0.05 |
| | 1900 | 6,000 | 0.5, 1.0 |
| 120-grit sanded plus electropolished | 1900 | 10,000 | 0.05 |
| 600-grit sanded | 1900 | 8,000-10,000 | 0.05 |
| | 1550 | 11,000 | 0.05 |
| | 1750 | 9,000 | 0.05 |
| | 1900 | 6,000 | 0.5, 1.0 |
| 600-grit sanded plus electropolished | 1900 | 10,000-12,000 | 0.05 |
| | 1900 | 6,000 | 0.5, 1.0 |
| | 2100 | 12,000 | 0.05 |
| | 2100 | 3,000 | 1.0 |
| | 1500 | 14,000 | 3.0 |
| | 1300 | 25,000-40,000 | 1.0 |
| | 2175 | 2,000 | 2.0 |

Commercial TD-NiCr

| | | | |
|---|---|---|---|
| 120-grit sanded | 1900 | 6,000 | 0.5, 1.0 |
| | 2000 | 9,000-15,000 | 0.05 |
| 120-grit sanded plus electropolished | 2000 | 10,000 | 0.05 |
| 600-grit sanded | 1750-2000 | 9,500 | 0.05 |
| | 1900 | 6,000 | 0.5, 1.0 |
| 600-grit sanded | 2000 | 10,000 | 0.05 |
| | 1900 | 6,000 | 1.0 |
| | 1500 | 14,000 | 3.0 |
| | 2100 | 3,000 | 1.0 |

The 2,000°F tensile-shear strength data for the parent materials is shown in TABLE III. The material that was specially processed plus heat treated at 2,300°F for 1 hour exhibited strengths equivalent to that of the heat-treated commercial TD—NiCr. The average parent metal tensile-shear strength is 9,500 psi at 2,000°F.

The welds made in the specially processed TD—NiCr had an average tensile-shear strength of about 7,500 pounds per square inch. This represents a joint efficiency of 79 percent. However, the specially processed TD—NiCr weldments failed mostly in the parent material, away from the original weld interface. Close inspection of the planar view of the failed specimen showed a tension type of fracture away from the weld in addition to the shear fracture. This is caused by the bending moment on the joint that exists when the shear load is applied because of the weld specimen configuration. This bending moment is much less when testing the parent metal configuration. Because of the bending moment and location of the fracture it is believed the joint efficiency actually approaches 100 percent. Therefore, parent metal strength was attained in tensile shear testing.

TABLE III — PARENT METAL STRENGTHS AT 2000°F

| Type of test | Material condition | Shear stress at failure psi | Time hr |
|---|---|---|---|
| Tensile shear | Commercial plus heat treated | 6,560 | |
| | Commercial plus heat treated | 10,200 | |
| | Specially processed plus heat treated | 10,500 10,500 | |
| Creep-rupture shear | Commercial plus heat treated | 2,800 | 261.0 |
| | Specially processed plus heat treated | 3,950 | 2.2 |
| | | 3,700 | 27.2 |
| | | 3,160 | 66.6 |

Parent TD—NiCr creep-rupture shear data was obtained and is shown in TABLE III. This data indicates a 100 hour life at about 3,100 psi at 2,000°F. Comparison of parent and weld strengths in TABLE IV shows that parent metal strength has also been obtained in creep-rupture shear tests.

While a preferred embodiment of the invention has been described it will be appreciated that various modifications may be made to the process without departing

TABLE IV — STRENGTHS OF WELDS AT 2000°F

| Type of test | Material condition | Shear stress at failure psi | Time hr | Location of fracture |
|---|---|---|---|---|
| Tensile-shear | Special processed plus heat treated | 8,140 | | Parent |
| | | 6,500 | | Parent |
| | | 7,600 | | Parent and weld |
| | | 7,600 | | Parent and weld |
| | Commercial plus heat treated | 4,020 | | Weld |
| | | 7,500 | | Weld |
| Creep-rupture | Specially processed plus heat treated | 2,920 | 108.4 | Parent |
| | | 2,970 | 335.4+ | " |
| | | 3,500 | 23.5 | " |
| | | 3,970 | 13.9 | " |
| | | 3,030 | 405.4+ | " |
| | | 3,400 | 379.9+ | " |
| | | 4,050 | 17.3 | " |
| | Commercial plus heat treated | 3,010 | 43.3 | Parent |
| | | 3,400 | 287.2+ | Weld |

What is claimed is:

1. A method of solid state welding members of uncrystallized materials comprising the steps of
providing mating surfaces on the members to be welded that are flat and free of stored energy thereby preventing the formation of small grains,
assembling said members with said mating surfaces in intimate contact,
heating the assembled members to a first temperature at which said members are substantially ductile,
applying a first pressure to said assembled members while heated to said first temperature,
heating the assembled members to a second temperature which is substantially higher than said first temperature, and
applying a second pressure to said members which is substantially lower than said first pressure while heated to said second temperature to cause diffusion, recrystallization, and grain growth across the original interface.

2. A method of solid state welding as claimed in claim 1 wherein the members are of a material which undergoes recrystallization and grain growth upon heating.

3. A method of solid state welding as claimed in claim 2 wherein the members are of a dispersion-strengthened alloy.

4. A method of solid state welding as claimed in claim 3 wherein the members are of a nickel alloy.

5. A method of solid state welding as claimed in claim 4 wherein the members are of a nickel alloy selected from a group consisting of $Ni-ThO_2$, $Ni-Cr-ThO_2$, $Ni-Mo-ThO_2$, and $Ni-Cr-Al-ThO_2$.

6. A method of solid state welding as claimed in claim 5 wherein the members are of a dispersion-strengthened nickel alloy that is unrecrystallized prior to heating.

7. A method of solid state welding as claimed in claim 6 wherein the members are heated to a first temperature of about 1,300°F at a first pressure of about 30,000 psi for about 1 hour.

8. A method of solid state welding as claimed in claim 7 wherein the members are heated to a second temperature of about 2,100°F at a second pressure of about 2,000 psi for about 2 hours.

9. A method of solid state welding as claimed in claim 1 wherein the members are heat treated subsequent to the application of the second pressure.

10. A method of solid state welding as claimed in claim 9 wherein the members are heat treated at about 2,300°F for about 1 hour.

* * * * *